United States Patent
Epps et al.

(10) Patent No.: US 6,440,905 B1
(45) Date of Patent: Aug. 27, 2002

(54) SURFACTANTS AND DISPERSANTS BY IN-LINE REACTION

(75) Inventors: Donald E. Epps, Houston, TX (US); Timothy C. Sepelak, Willoughby, OH (US); Steven C. Oxley, Deer Park, TX (US); Frederic J. Martin, Chagrin Falls, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/841,217

(22) Filed: Apr. 24, 2001

(51) Int. Cl.$^7$ .................. C10M 133/44; C10M 129/66
(52) U.S. Cl. ................ 508/291; 508/306; 508/506
(58) Field of Search .................. 508/291, 306, 508/506

(56) References Cited

U.S. PATENT DOCUMENTS

| | | |
|---|---|---|
| 3,194,813 A | 7/1965 | Le Suer et al. .......... 260/326.5 |
| 3,272,746 A * | 9/1966 | LeSuer et al. ............. 508/291 |
| 3,306,908 A | 2/1967 | Le Suer ................. 260/326.3 |
| 3,361,673 A | 1/1968 | Stuart et al. ............... 252/51.5 |
| 4,329,249 A * | 5/1982 | Forsberg ................. 508/291 |
| 4,579,674 A | 4/1986 | Schlicht .................. 252/51.5 |
| 5,073,600 A | 12/1991 | Gorman et al. ............ 525/264 |
| 5,235,067 A | 8/1993 | Allen et al. ................. 548/520 |
| 5,624,999 A | 4/1997 | Lombardi et al. |
| 5,885,944 A * | 3/1999 | Pudelski et al. ........... 508/306 |
| 5,972,852 A * | 10/1999 | Robson ................... 508/306 |
| 6,140,280 A * | 10/2000 | Nakano et al. ............ 508/291 |
| 6,165,235 A | 12/2000 | Kolp et al. ................. 44/331 |

* cited by examiner

Primary Examiner—Jacqueline V. Howard
(74) Attorney, Agent, or Firm—David M. Shold; Michael F. Esposito

(57) ABSTRACT

A surfactant is synthesized from an amine or an alcohol and a hydrocarbyl-substituted succinic acylating agent by feeding the amine or alcohol into a stream comprising the hydrocarbyl substituted succinic acylating agent, to form a combined stream; passing the combined stream through an in-line mixer so as to effect premixing and initial reaction of the components; and thereafter passing the combined stream into a reactor, where the combined stream is further processed to form the surfactant.

38 Claims, 1 Drawing Sheet

SURFACTANTS AND DISPERSANTS BY IN-LINE REACTION

BACKGROUND OF THE INVENTION

The present invention relates to a method for preparing surfactants, and especially succinimide dispersants which are useful as lubricant additives.

Surfactants encompass a well-known and wide variety of surface active agents with numerous uses in industry and commerce. Among the commercially important surfactants are those commonly known as dispersants. These materials have been known and used for many years in the lubricants industry for the purpose of dispersing sludge and other contaminants that can develop in engine oils.

Surfactants generally comprise a polar "head" portion and a non-polar "tail." In many instances the head and tail portions, or parts of them, need to be combined chemically to produce the final product, and this combination may involve the physical mixing of relatively polar and relatively non-polar reactants. It has now been found that the completeness and efficiency of the physical mixing, which may occur at the time of or just prior to the beginning of the reaction of the components, can have important effects on the physical and chemical properties of the final product. Thus, certain surfactants such as nitrogen-containing dispersants have been found to have improved properties of clarity, ease of filterability, and compatibility when they are prepared using the premixing technology of the present invention.

U.S. Pat. No. 5,073,600, Gorman et al., Dec. 17, 1991, discloses dispersant viscosity index improvers and a process of functionalizing a base polymer by grafting alpha-beta unsaturated carboxylic acid, anhydride, or ester to a base polymer. The grafting is performed in a blending device capable of imparting high mechanical energy. As the polymer with the carboxylic acid functionality grafted to it, diluent, and free radical initiator continue to move through the blending apparatus (e.g., an extruder), the blend is next contacted with an amine which is introduced into the extruder through a line. The reaction between the amine and the acid functionality which is grafted onto the polymer occurs within a reaction zone (i.e., within the extruder).

U.S. Pat. No. 5,624,999, Lombardi et al, Apr. 29, 1997, discloses an ashless dispersant prepared from reactants in different phases by reacting the reactants in a reaction region defined by adjacent surfaces between which there is relative movement or on a thin film on a surface over which they move.

SUMMARY OF THE INVENTION

The present invention provides a method for synthesizing a surfactant from an amine or alcohol and a hydrocarbyl-substituted succinic acylating agent, comprising: feeding the amine into a stream comprising the hydrocarbyl substituted succinic acylating agent, to form a combined stream; passing said combined stream through an in-line mixer so as to effect premixing and initial reaction of the components; and thereafter passing the combined stream into at least one reactor, wherein said combined stream is further processed to form said surfactant.

The invention similarly provides a method for synthesizing a surfactant from water and a hydrocarbyl-substituted succinic anhydride, comprising: feeding the water into a stream comprising the hydrocarbyl substituted succinic anhydride, to form a combined stream; passing said combined stream through an in-line mixer so as to effect premixing and initial reaction of the components; and thereafter passing the combined stream into at least one reactor, wherein said combined stream is further processed to form said surfactant.

DETAILED DESCRIPTION OF THE INVENTION

Figure 1:
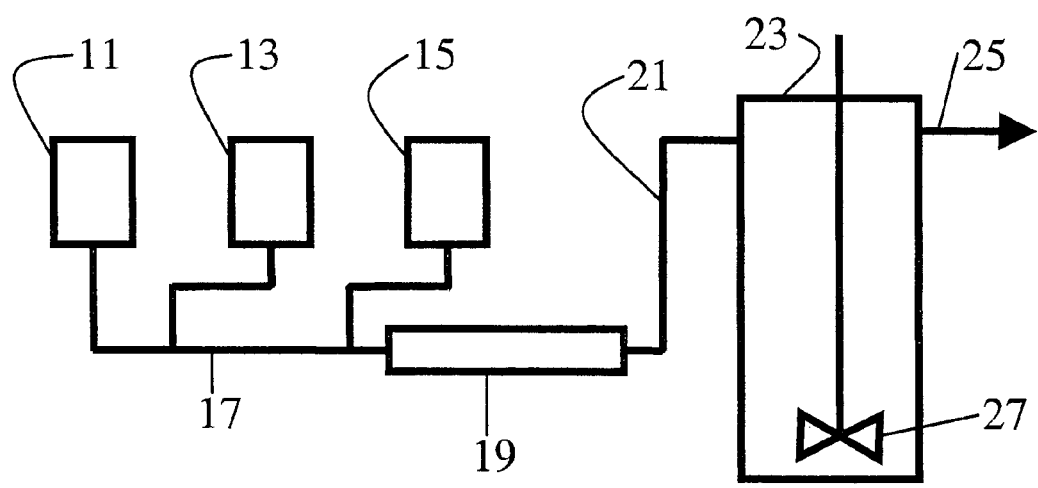
FIG. 1 represents a typical arrangement of the feeds, mixing device, and reactor of the present invention.

Various preferred features and embodiments will be described below by way of non-limiting illustration.

A typical schematic diagram of the present invention is present in FIG. 1. Here a succinic acylating agent stream is provided from vessel 11. The succinic anhydride component may contain a certain amount of diluent if desired in order to assure that the succinic anhydride is in a fluid form. Optionally the succinic acylating agent stream is combined with other components, typically a diluent or fluid medium, which can be supplied from vessel 13 if desired. These other components can be optionally pre-mixed with the succinic acylating agent using a separate in-line mixer (not shown) or other means, prior to addition of amine. To this initial stream, typically flowing through pipe 17, is supplied an amine (or alternatively an alcohol), from vessel 15. The amine stream is supplied upstream (and typically immediately upstream) of an in-line mixer 19, which will effect mixing of the components as they pass through. After passing through the in-line mixer 19, the reaction mixture passes (optionally through a section of piping 21) into a reactor 23, in which the components further react or are otherwise processed to form the product. The reactor 23 can, if desired, be a continuous stirred tank reactor with a conventional stirring element 27. The product exits the reactor through exit 25, whence it can be optionally further treated and finished. Other conventional elements such as heaters and filters are not shown.

The temperature at which the components are combined and will pass through the in-line mixer will depend on the particular chemicals to be reacted. In many instances the mixing of the chemicals will initiate an exothermic reaction, so that heating requirements will be reduced compared to what they would be in the absence of exothermicity. In many instances, including in particular the reaction of a hydrocarbyl-substituted succinic acylating agent with an amine, it is desirable that the temperature at which the components flow through the in-line mixer should be at room temperature or above, e.g., 80 to 160° C., preferably 90 to 130° C., more preferably 95 to 120° C.

The residence time of the mixture in the in-line mixer and in the subsequent pipe leading to the reactor is a variable which can be adjusted by the person skilled in the art to provide optimum results. In one embodiment the residence time is at least 5 seconds, more typically at least 15 seconds, preferably 0.3 minutes to 20 minutes, more preferably 2 to 5 minutes, e.g., about 3.5 minutes. This residence time will typically be sufficient to provide both an adequate degree of mixing and an appropriate amount of reaction or pre-reaction before the reaction mixture is led into the subsequent reactor.

The in-line mixer should provide at least a minimum effective amount of mixing of the components to lead to improved physical properties of the product, such as those described above. One way to measure the extent of mixing is by use of the parameter "Coefficient of Variation" ("COV"). This is a parameter well known to those skilled in the art, and is described in greater detail in Myers et al., "Static Mixers," *Chemical Engineering Progress*, June, 1997, pages 28–38. In summary, the COV of a combination of two materials, before any mixing has occurred, is expressed as $$COV_0 = \sqrt{\frac{1 - \Phi_a}{\Phi_a}}$$

where $\Phi_a$ is the ratio of the volumetric flow rate of the added material (such as an amine component, which may be the smaller component) to the total volumetric flow rate (which may be significantly larger, particularly if a diluent such as diluent oil is included). The COV after the material is passed through a helical element mixer, as a fraction of $COV_0$, can be estimated from a graph presented in that reference (refer to FIG. 6 therein), which shows a value substantially independent of Reynolds number up to Re=100, and a linear decrease thereafter plotted on a log-log scale. Alternatively, a value for $COV/COV_0$ can be approximately estimated or interpolated from the following table, which is extracted from that reference figure:

| approximate $COV/COV_0$ No. of Helical Mixing Elements | Reynolds Number | | | |
| --- | --- | --- | --- | --- |
| | ≤100 | 200 | 500 | 1000 |
| 2 | 0.7 | 0.3 | 0.12 | 0.6 |
| 4 | 0.4 | 0.2 | 0.07 | 0.02 |
| 6 | 0.3 | 0.10 | 0.03 | 0.013 |
| 12 | 0.07 | 0.02 | 0.004 | 0.0014 |
| 18 | 0.02 | 0.04 | 0.0006 | 0.0002 |

As estimated by the above procedure, the COV of the mixture after passing through the in-line mixer should preferably be at most 3.5, preferably at most 3.0, 2.5, or 2.0. Even more effective mixing may be desirable, leading to COV of at most 1.5, 1.0, 0.5, or even 0.05.

Any of a variety of in-line mixers can be used, including dynamic mixers (which involve mechanical agitation of one type or another), including propeller mixers, turbine mixers, rotor-stator mixers, colloid mills, and pressure homogenizers. A multitude of such devices are commercially available. Conventional stirred tank reactors are not intended to be interpreted to be in-line mixers; feeding the components into a plurality of stirred tank reactors in series is known. Preferably, however, the in-line mixer is a static mixer, that is, consisting of a number of static (non-moving) mixing elements. Turbulent vortex mixers are commonly used for mixing fluids with high Reynolds Numbers (typically>10,000) An example of a turbulent vortex mixer is a High-Efficiency Vortab™ mixer. Helical element mixers are commonly used for laminar flow mixing; examples include Kenics™ mixers and Lightnin'™ mixers. Mixing mechanisms and designs of typical mixers are described in greater detail in the above-mentioned article by Myers et al. Useful mixers include static mixers having a multiplicity of right handed and left handed blade elements, for instance, 6 elements. It is found that significant improvement can be obtained even with this relatively small number of mixing elements, even though much more thorough mixing could be obtained with a larger number such as 12 or 18.

After exiting the in-line mixer, the mixture is passed into a reactor. The mixer can lead directly into the reactor or it can be connected by means of tubing or piping of various lengths. The piping can be heated if desired. Reaction among the components of the mixture may proceed to a greater or lesser degree within the mixer itself and may continue, possibly even to completion, within the piping. In that case, the piping is considered to be an element of the reactor.

The reactor can be of any of a number of designs, including tubular, tank, continuous, batch, or semi-continuous reactors. Pieces of equipment are to be considered as encompassed by the term "reactor" even if they may be otherwise named, such as "holding tank" or "filter tank." What is required is that further processing or reaction, such as condensation, salt formation, or removal of water, occurs in the equipment.

The temperature in the reactor is normally room temperature or above, typically 80 to 220° C. Commonly the temperature is at least 100° C. so that water of reaction can be removed, if a condensed product is being formed. Thus temperatures of 100 to 200° C. can be used, or, for instance, 140 to 180° C. or 150 to 170° C.

The reactor is typically a stirred reactor, such as a stirred tank reactor. It can be a continuous stirred tank reactor or a batch stirred tank reactor. The residence time in the reactor can be 0.1 to 20 hours, depending on the degree of completeness of reaction that is desired. Commonly, residence times of 0.5 to 10 hours, or 1 to 5 hours, can be used.

After the desired hold time is maintained in the reactor, the product can be removed and further treated or worked-up as desired. Alternatively, the material from the reactor can be directed into one or more subsequent reactors if further reaction time or hold time is desired. The hold time and temperature conditions of any such subsequent reactor will be generally within the same ranges as those set forth above for the first reactor. The specific conditions of the subsequent reactor need not be the same as those of the first reactor, however.

The method of the present invention can be used to prepare any of a variety of surfactants or dispersants which require mixing and reacting of a relatively polar component and a relatively non-polar component. Examples of such surfactants include the reaction product of a succinic anhydride substituted by a 1000 $\overline{M}_n$ polyisobutylene group with an alkanolamine such as diethylethanolamine; the reaction product of a succinic anhydride substituted by a 1550 $\overline{M}_n$ polyisobutylene group with ethylene glycol, followed by addition of dimethylaminoethanol; the reaction of hexadecenyl succinic anhydride with water to provide the succinic acid, followed by the salt forming reaction with diethylethanolamine; and the reaction of succinic anhydride substituted by a 2300 $\overline{M}_n$ polyisobutylene group with water to provide the succinic acid, followed by the salt forming reaction with diethylethanolamine. In those cases in which an anhydride is reacted with water and an amine, the components may be combined simultaneously or sequentially, e.g., the anhydride being first reacted with water to form the acid, and the resulting acid then reacted with the amine. In any event, the amine should be fed upstream of the in-line mixer.

Hydrocarbyl-substituted succinic acylating agents include hydrocarbyl substituted succinic anhydrides and reactive equivalents thereof such as acids, acid halides, and esters, as will be apparent to those skilled in the art. While the anhydride form is sometime preferable because of the relatively greater reactivity, the other equivalents can be used as desired, Depending upon the reaction involved, the reaction conditions may need to be varied. Acids and esters, for example, are less reactive to certain condensation reactions than are anhydrides.

It is apparent that salt-, amide-, or imide-forming reactions can occur between a succinic acid or anhydride species and an amine, depending on the reaction conditions, more vigorous conditions often being required for reactions with the acid. The reaction between a succinic anhydride and an alcohol will normally form an ester, or, more properly an acid-ester, again depending on the reaction conditions. Reaction between a succinic acid and an alcohol can lead to the formation of an ester, but this will normally require more rigorous conditions than when the anhydride is employed. Accordingly, the anhydride is generally preferred for this reaction.

Moreover, the reaction of hydrocarbyl-substituted succinic anhydride and water, to form the diacid, can benefit from the present invention. The enhanced contact between the anhydride and the water by virtue of adding water to the anhydride upstream of an in-line mixer can lead to increased efficiency of the reaction. The resulting hydrocarbyl-substituted succinic acid can itself be used as a surfactant and can be used as an intermediate in preparing other surfactants and dispersants, including salts of the acid.

The present invention, however, is particularly well suited for preparing succinimide dispersants. Succinimide dispersants are typically prepared by the condensation of a hydrocarbyl substituted succinic acylating agent, specifically, a dicarboxylic acid (e.g., succinic acid), or anhydride, or reactive equivalent thereof (e.g., acid halide or ester) with an amine, often a polyamine. If the amine contains at least one primary amino group (R—HN$_2$), then it is possible that condensation and cyclization can occur to lead to the imide structure. Reaction under less stringent conditions, or in the absence of a primary amino group, can lead to amide formation, without cyclization to the imide. Commonly a mixture of structures is formed. All of the foregoing are intended to be encompassed by the use of the term "succinimide dispersant."

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The hydrocarbyl group substituent on the acylating agent generally contains an average of at least 8, or 30, or 35 up to 350, or to 200, or to 100 carbon atoms.

In one embodiment, the hydrocarbyl group is derived from a polyalkene. The polyalkene is characterized by an n (number average molecular weight) of at least 500. Generally, the polyalkene is characterized by an n of 500, or 700, or 800, or even 900 up to 5000, or to 3000, or to 2500, or to 2000, or even to 1500.

The polyalkenes include homopolymers and interpolymers of polymerizable olefin monomers of 2 to 16 or to 6, or to 4 carbon atoms. The olefins may be monoolefins such as ethylene, propylene, 1-butene, isobutene, and 1-octene; or a polyolefinic monomer, such as diolefinic monomer, such 1,3-butadiene and isoprene. An example of a suitable polymer is a polybutene such as polyisobutylene. The polyalkenes are prepared by conventional procedures.

The preparation and use of substituted succinic acylating agents wherein the substituent is derived from polyalkenes are described in U.S. Pat. No. 4,234,435.

In another embodiment, the succinic acylating agents are prepared by reacting the above described polyalkene with an excess of maleic anhydride to provide substituted succinic acylating agents wherein the number of succinic groups for each equivalent weight of substituent group is at least 1.3, or to 1.5, or to 1.7, or to 1.8. The maximum number generally will not exceed 4.5, or to 2.5, or to 2.1, or to 2.0.

In another embodiment, the hydrocarbyl group contains an average from 8, or 10, or 12 up to 40, or to 30, or to 24, or to 20 carbon atoms. In one embodiment, the hydrocarbyl group contains an average from 16 to 18 carbon atoms. In another embodiment, the hydrocarbyl group is tetrapropenyl group.

The hydrocarbyl group may be derived from one or more olefins having from 2 to 40 carbon atoms or oligomers thereof. These olefins are preferably alpha-olefins (sometimes referred to as mono-1-olefins) or isomerized alpha-olefins. Examples of the alpha-olefins include ethylene, propylene, butylene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions may also be used.

The succinic acylating agents can be prepared by reacting the above-described olefins or polyalkene with unsaturated carboxylic acylating agents, such as itaconic, citraconic, or maleic acylating agents at a temperature of 160°, or 185° C. up to 240° C., or to 210° C. Maleic acylating agents are the preferred unsaturated acylating agent. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535–537.

The olefin or polyalkene can be reacted with the carboxylic reagent such that there is at least one mole of carboxylic reagent for each mole of olefin or polyalkene that reacts. Preferably, an excess of carboxylic reagent is used. In one embodiment, this excess is 5% to 25%. In another embodiment, the excess is greater than 40%, or greater than 50%, and even greater than 70%.

The conditions, i.e., temperature, agitation, and solvents for forming the hydrocarbyl-substituted succinic acylating agent, are known to those in the art. Examples of patents describing various procedures for preparing useful acylating agents include U.S. Pat. No. 3,172,892 (Le Suer et al.); U.S Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S Pat. No. 4,234,435 (Meinhardt et al); and U.K. 1,440,219.

Processes for preparing hydrocarbyl-substituted succinic acylating agents include those which involve the use of a chlorination process as well as direct alkylation processes which do not involve chlorine. A favored low-chlorine process is that disclosed in U.S. Pat. No. 6,165,235, Kolp et al., Dec. 26, 2000, which produces materials including those represented by the structure

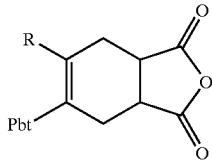

In this structure, R represents H or —$CH_3$ and Pbt represents the remainder of a polyisobutene group (that is, a polyisobutene substituent except for a terminal —$C(CH_2—)=C(CH_2—)$—R portion which participates in formation of the indicated cyclic structure.

The amine which reacts with the succinic acylating agent can be a monoamine, a polyamine, or an aminoalcohol. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

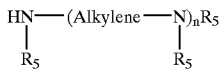

wherein n has an average value from 1, or 2 to 10, or to 7, or to 5, and the "Alkylene" group has from 1, or 2 to 10, or to 6, or to 4 carbon atoms. They may contain, for instance, on average 3 to 8 nitrogen atoms. Each $R_5$ is independently hydrogen, or an aliphatic or hydroxy-substituted aliphatic group of up to 30 carbon atoms. Such alkylenepolyamines include methylenepolyamines, ethyle-nepolyamines (also referred to as polyethyleneamines), butylenepolyamines, propylenepolyamines, and pentylenepolyamines. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2—aminoethyl)amine, propylenediamine, trimethylenediamine, tripropylenetetramine, tetraethylenepentamine, hexaethyleneheptamine, and pentaethylenehexamine. Other alkylenepolyamines include dimethylamino propylamine and N-(3-aminopropyl)morpholine.

Higher homologs obtained by condensing two or more of the above-noted alkylene amines are similarly useful as are mixtures of two or more of the aforedescribed polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water or ammonia. These reactions result in the production of a complex mixture of polyalkylenepolyamines including cyclic condensation products such as the aforedescribed piperazines. Ethylenepolyamine mixtures are useful.

Other useful types of polyamine mixtures are those resulting from stripping of the above-described polyamine mixtures to leave as residue what is often termed "polyamine bottoms" or "amine still bottoms." In general, alkylenepolyamine bottoms can be characterized as having less than two, usually less than 1% (by weight) material boiling below 200° C.

Another useful polyamine is a condensation reaction between at least one hydroxy compound with at least one polyamine reactant containing at least one primary or secondary amino group. The hydroxy compounds are preferably polyhydric alcohols and amines. Preferably the hydroxy compounds are polyhydric amines. The amine condensates and methods of making the same are described in U.S. Pat. No. 5,053,152 and PCT publication WO86/05501.

In another embodiment, the polyamines are hydroxy-containing polyamines. Hydroxy-containing polyamine analogs of hydroxymonoamines, particularly alkoxylated alkylenepolyamines (e.g., N,N(diethanol)ethylenediamine) may also be used. Such polyamines may be made by reacting the above-described alkylenepolyamines with one or more of the above-described alkylene oxides.

Other amino alcohols include dimethylaminoethanol, diethylaminoethanol, diethanolamine, triethanolamine, N-methyl diethanolamine, monoethanolamine, N-methyl-monoethanolamine, and (2-aminoethyl)ethanolamine. Other examples include ethoxylated amines sold under the trade name Ethamine™

Other amines include polyethers capped on one or preferably both ends by alkyleneamine groups such as —$CH_2CH(CH_3)NH_2$. A commercially available example having a $\overline{M}_n$ of about 2000 is sold under the trade name Jeffamine™ ED-2003.

Other types of amine can also be reacted. These include sodium-2-aminoethane sulfonate, also referred to as sodium taurine. A reaction with dodecylsuccinic acid and sodium taurine is run in an aqueous environment; optionally the initial reaction product can be further heated to form an imide.

The reaction products of hydrocarbyl-substituted succinic acylating agents and amines and methods for preparing the same—absent the features of the present invention—are described in U.S. Pat. Nos. 4,234,435; 4,952,328; 4,938,881; 4,957,649; and 4,904,401.

EXAMPLES

For all examples, the dispersants are prepared by a continuous process involving one or more continuous stirred tank reactors, except as noted. In each case the amount and compositional analysis of the dispersant reported is inclusive of diluent oil, which is conventionally present in such dispersants at a level of 50–55% by weight.

Example 1 and Comparative Example 1C

A dispersant is prepared by reacting polyisobutenyl (m.w. 1600–3000) succinic anhydride with polyethyleneamines. The anhydride material is supplied in a diluent oil medium. The mixture of Example 1 is passed through an in-line static mixer with helical mixing elements prior to delivery to a reaction vessel. The resulting dispersant composition contains 0.75 to 1.05 percent by weight nitrogen. The mixture of comparative Example 1C is not passed through an in-line mixer prior to delivery to the reaction vessel (although the succinic anhydride and diluent oil do pass through the mixer). The amine component is added directly to the reaction vessel by a separate inlet.

The turbidity of the resulting product in each case is measured by the JTU-1A method. In this method, a sample of the dispersant is diluted with a standard oil in a glass tube to a concentration of 20% dispersant. The tube is then placed into a turbidometer, which passes light through the sample. The results are expressed in Jackson Turbidity Units. A higher value indicates greater turbidity of the sample. The results are shown in the Table I, two separate measurements being reported for duplicate samples prepared by each process:

TABLE I

|  | Example 1 | Example 1C |
|---|---|---|
| Turbidity | 3.6, 4.2 | 29, 27 |

Examples 2, 3, 4 and Comparative Examples 2C, 3C, and 4C

Dispersants prepared according to Example 1 and comparative Exampie 1C were formulated into various conventional engine oil formulations. Examples 2, 3, and 4 contain 6.6%, 5.1%, and 4.0%, respectively, of material according to Example 1. Comparative examples 2C, 3C, and 4C contain similar amounts of material according to comparative Example 1C.

The formulations of Example 2 and 2C are prepared as a 10W–40 viscosity grade using mineral base stocks and using an additive package which includes antioxidant(s), calcium detergent(s), (other additional) dispers ant(s), antiwear agent (s), antifoam agent(s), and friction modifier(s). The formulations of Example 3 and 3C are prepared as a 5W–30 viscosity grade using hydrotreated base stocks and a similar additive package. The formulations of Example 4 and 4C are prepared as a 5W–30 viscosity grade using mineral base stocks and a similar additive package.

The turbidity of each sample is tested as above (however, not being diluted to 20% concentration). The results, based on measurements of samples of the duplicate preparations reported in Table I, each are shown in Table II.

TABLE II

| Example | 2 | 2C | 3 | 3C | 4 | 4C |
|---|---|---|---|---|---|---|
| Turbidity | 20, 22 | 34, 40 | 22, 20 | 46, 44 | 12, 12 | 26, 24 |

Example 5 and Comparative Example 5C

A second set of identically formulated succinimide dispersants are prepared as in Example 1 and comparative Example 1C, respectively. The dispersant compositions are different in detail from those in the previous examples and contain 1.05 to 1.30 percent by weight nitrogen. When tested by the method of Example 1 at 20% concentration, the results, based on measurement of three samples each, are as shown in Table III. The six samples reported are from six separate preparative runs.

TABLE III

|  | Example 5 | Example 5C |
|---|---|---|
| Turbidity | 9[a], 7, 3[b] | 30, 16[b], 21[b] |

[a]A sample from one run in which the configuration of pipe(s) and tank(s) was altered failed to show improvement over a comparative run, for reasons that are not known.
[b]Prepared using a stirred batch reactor.

Examples 6, 7 and Comparative Examples 6C and 7C

Dispersants prepared according to Example 5 and comparative Example 5C were formulated into various conventional engine oil additive concentrates, containing other conventional components. Examples 6 and 7 contain material according to Example 5, while comparative examples 6C and 7C contain material according to comparative Example 5C. The amount of dispersant in 6 and 6C is 57%; the amount of dispersant in 7 and 7C is 55% (each inclusive of diluent oil).

The turbidity of each concentrate is tested by the method described above. The results, based on measurements of two samples of the materials prepared as in Example 5 and one sample of the material prepared as in comparative Example 5C are shown in Table IV.

TABLE IV

| Example | 6 | 6C | 7 | 7C |
|---|---|---|---|---|
| Turbidity | 230, 166 | 340 | 180, 178 | 266 |

Examples 8, 9, and 10 and Comparative Examples 8C, 9C, and 10C

The dispersants reported in Example 5 and comparative Example 5C are formulated into diesel engine oil formulations, containing other conventional diesel oil additives. The dispersants of the present invention, from Example 5, are used in Examples 8, 9, and 10. The comparative dispersants from comparative Example 5C are used in Comparative Examples 8C, 9C, and 10C. The formulations for Examples 8, 8C, 9, and 9C are prepared in a 15W–40 hydrotreated base stock. The formulations for Examples 10 and 10C are formulated in a 15W–40 mineral oil base stock. The concentrations of the dispersant compositions are 9.5, 7.2, and 7.2 percent for 8 and 8C, 9 and 9C, and 10 and 10C, respectively. The results of turbidity measurements are shown in Table V:

TABLE V

| Example | 8 | 8C | 9 | 9C | 10 | 10C |
|---|---|---|---|---|---|---|
| Turbidity | 36,34, 24[b] | 44,40, 40[b] | 26,26, 20[b] | 36,30[b], 32[b] | 24,22[b], 18[b] | 30,28[b], 32[b] |

[b]Prepared using a stirred batch reactor.

Example 11. Storage Stability

Improved compatibility of the dispersants prepared by the method of present invention is illustrated by visually observing the samples after storage over a period of time in the presence of steel, at room temperature or at 65° C. The results of such observation of concentrates designated as Example 6 and comparative Example 6C, above, are reported in Table VI

TABLE VI

|  | Example 6 (first sample) | | Example 6 (second sample) | | Comparative Example 6C | |
|---|---|---|---|---|---|---|
| Storage time | room temp. | 65° C. | room temp. | 65° C. | room temp. | 65° C. |
| 1 week | clear | clear | clear | very slight haze | very slight haze | very slight haze |
| 2 weeks | clear | clear | clear | very slight haze | very slight haze | very slight haze |

TABLE VI-continued

| Storage time | Example 6 (first sample) | | Example 6 (second sample) | | Comparative Example 6C | |
|---|---|---|---|---|---|---|
| | room temp. | 65° C. | room temp. | 65° C. | room temp. | 65° C. |
| 3 weeks | clear | clear | clear | very slight haze | slight haze | very slight haze |
| 4 weeks | clear | clear | clear | clear | slight haze | very slight haze |
| 26 weeks | clear | clear | clear | clear & light sediment | slight haze | very slight haze |

Example 12 and Comparative Example 12C.
Filterability

Fully formulated engine oils are prepared containing the dispersant of the present invention (from Example 5, 1st sample) and containing the comparative dispersant (from Comparative Example 5C, 1st sample). The formulated oils are tested for filterability by the AFNOR (Association Francaise de Normalisation) standard classification index 48–691, which measures the filterability of mineral oils in the presence of water. Lower filterability indices indicate improved filterability. Results are presented in Table VII.

TABLE VII

| Filterability Index: | Ex. 12 | Ex. 12C |
|---|---|---|
| Dry (1.2 μm filter) | 1.06 | 1.13 |
| Presence of water (5 μm filter) | 1.22 | filter blocked |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

What is claimed is:

1. A method for synthesizing a surfactant from an amine or an alcohol and a hydrocarbyl-substituted succinic acylating agent, comprising:
    feeding the amine or alcohol into a stream comprising the hydrocarbyl substituted succinic acylating agent, to form a combined stream;
    passing said combined stream through an in-line mixer so as to effect premixing and initial reaction of the components; and thereafter
    passing the combined stream into at least one reactor, wherein said combined stream is further processed to form said surfactant.

2. The method of claim 1 wherein the combined stream is passed through the in-line mixer at a temperature of about 80 to about 160° C.

3. The method of claim 2 wherein the temperature is about 90 to about 130° C.

4. The method of claim 1 wherein the residence time of the combined stream after entering the in-line mixer and before entering the subsequent reactor is at least about 15 seconds.

5. The method of claim 4 wherein the residence time is about 0.3 to about 20 minutes.

6. The method of claim 1 wherein the in-line mixer provides a degree of mixing of the components expressed as a coefficient of variation of at most about 3.5.

7. The method of claim 1 wherein the in-line mixer is a static mixer.

8. The method of claim 7 wherein the static mixer comprises a multiplicity of right handed and left handed blade elements.

9. The method of claim 1 wherein the mixture is reacted in the reactor at a temperature of about 80 to about 220° C.

10. The method of claim 9 wherein the temperature in the reactor is about 100 to about 200° C.

11. The method of claim 1 wherein water of reaction is removed from the reactor.

12. The method of claim 1 wherein the reactor is a stirred reactor.

13. The method of claim 12 wherein the stirred reactor is a continuous stirred tank reactor.

14. The method of claim 12 wherein the stirred reactor is a stirred batch reactor.

15. The method of claim 1 wherein the residence time in the reactor is about 0.1 to about 20 hours.

16. The method of claim 15 wherein the residence time in the reactor is about 0.5 to about 10 hours.

17. The method of claim 13 further comprising passing the product from the continuous stirred tank reactor into a second continuous stirred tank reactor.

18. The method of claim 1 wherein the amine or alcohol comprises an amine.

19. The method of claim 18 wherein the amine comprises a polyamine.

20. The method of claim 19 wherein the polyamine comprises a polyethyleneamine.

21. The method of claim 20 wherein the polyethyleneamine contains on average about 3 to about 8 nitrogen atoms.

22. The method of claim 19 wherein the polyamine comprises amine still bottoms.

23. The method of claim 18 wherein the amine is an aminoalcohol containing at least one N—H group.

24. The method of claim 23 wherein the aminoalcohol comprises dimethylaminoethanol or diethylaminoethanol.

25. The method of claim 1 wherein the hydrocarbyl-substituted succinic acylating agent comprises a hydrocarbyl-substituted succinic anhydride.

26. The method of claim 25 wherein the stream which comprises hydrocarbyl-substituted succinic anhydride also comprises diluent oil.

27. The method of claim 25 wherein the hydrocarbyl-substituted succinic anhydride comprises a polyisobutene-substituted succinic anhydride.

28. The method of claim 27 wherein the polyisobutene substituent has a number average molecular weight of about 500 to about 5000.

29. The method of claim 27 wherein the polyisobutene substituent has a number average molecular weight of about 900 to about 3000.

30. The method of claim 1 wherein the hydrocarbyl-substituted succinic acylating agent is prepared by the use of chlorine.

31. The method of claim 1 wherein the hydrocarbyl-substituted succinic acylating agent comprises material represented by the structure

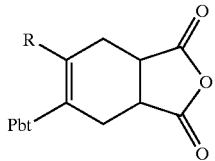

where R is H or methyl and Pbt represents a fragment of a polyisobutene substituent.

32. The method of claim 27 wherein the dispersant has a carbonyl: nitrogen mole ratio of about 1:0.7 to about 1:2.5.

33. The method of claim 1 wherein the surfactant is a dispersant.

34. The method of claim 33 wherein the dispersant is a succinimide dispersant.

35. The method of claim 1 wherein the surfactant is an amine salt.

36. A method for synthesizing a surfactant from water and a hydrocarbyl-substituted succinic anhydride, comprising:

feeding the water into a stream comprising the hydrocarbyl substituted succinic anhydride, to form a combined stream;

passing said combined stream through an in-line mixer so as to effect premixing and initial reaction of the components; and thereafter passing the combined stream into at least one reactor, wherein said combined stream is further processed to form said surfactant.

37. The composition prepared by the process of claim 1.

38. A lubricant comprising the composition of claim 37 and an oil of lubricating viscosity.

* * * * *

UNITED STATES PATENT AND TRADEMARK OFFICE
CERTIFICATE OF CORRECTION

PATENT NO.    : 6,440,905 B1
DATED         : August 27, 2002
INVENTOR(S)   : Donald E. Epps et al.

It is certified that error appears in the above-identified patent and that said Letters Patent is hereby corrected as shown below:

<u>Title page,</u>
Item [75], Inventor "Timothy C. Sepelak" should be spelled -- Timothy P. Sepelak --

Signed and Sealed this

Twenty-eighth Day of January, 2003

JAMES E. ROGAN
*Director of the United States Patent and Trademark Office*